United States Patent
Bolt et al.

[19]

[11] Patent Number: 5,971,723
[45] Date of Patent: Oct. 26, 1999

[54] DOSING PUMP

[75] Inventors: Erwin Bolt, Brugg, Switzerland; Traugott Durrer, Littau, Switzerland

[73] Assignee: KNF Flodos AG, Sursee, Switzerland

[21] Appl. No.: 08/983,211

[22] PCT Filed: Jul. 11, 1996

[86] PCT No.: PCT/EP96/03040

§ 371 Date: Jan. 13, 1998

§ 102(e) Date: Jan. 13, 1998

[87] PCT Pub. No.: WO97/03290

PCT Pub. Date: Jan. 30, 1997

[30] Foreign Application Priority Data

Jul. 13, 1995 [DE] Germany .......................... 195 25 557

[51] Int. Cl.$^6$ ............................................... F04B 17/03
[52] U.S. Cl. ...................... 417/413.1; 417/63; 137/854; 137/856
[58] Field of Search .................. 417/326, 413, 417/63; 137/854, 856

[56] References Cited

U.S. PATENT DOCUMENTS

| | | | |
|---|---|---|---|
| 2,144,662 | 1/1939 | Paasche | 230/171 |
| 3,807,445 | 4/1974 | McPhee | 137/557 |
| 4,550,749 | 11/1985 | Krikorian | 137/843 |
| 4,762,149 | 8/1988 | Picki, Jr. | 137/843 |
| 4,838,262 | 6/1989 | Katz | 128/205.24 |
| 4,925,371 | 5/1990 | Griesmar | 417/18 |
| 5,676,531 | 10/1997 | Muscarella et al. | 417/413.1 |

FOREIGN PATENT DOCUMENTS

| | | |
|---|---|---|
| 0 321 339 A | 6/1989 | European Pat. Off. . |
| 69 873 E | 1/1959 | France . |
| 2 527 699 | 12/1983 | France . |
| 2 588 319 | 4/1987 | France . |
| 33 20 386 C2 | 3/1987 | Germany . |
| 39 15 716 A1 | 11/1990 | Germany . |
| 40 25 114 A1 | 2/1992 | Germany . |
| 41 18 652 A1 | 8/1992 | Germany . |
| 58 481 A | 11/1911 | Switzerland . |
| 566 936 A | 1/1945 | United Kingdom . |
| WO 94/07714 | 4/1994 | WIPO . |

*Primary Examiner*—Timothy S. Thorpe
*Assistant Examiner*—Ehud Gartenberg
*Attorney, Agent, or Firm*—Akin, Gump, Strauss, Hauer & Feld L.L.P.

[57] ABSTRACT

A diaphragm dosing pump (1) has a rotary driving motor (3) electrically connected to control electronics (4). The motor is controlled in such a way that at the beginning and end of each dosing operation the driven diaphragm preferably always takes the same starting position, in particular a bottom dead center position. In order to achieve a reliable sealing behavior of the inlet and outlet valves even during slow working strokes and when the pressure difference between suction and compression sides is small, the valves are designed with elastic valve disks mounted without stress between their valve seat and an opposite rib-like stop.

14 Claims, 4 Drawing Sheets

DOSING PUMP

BACKGROUND OF THE INVENTION

The invention relates to a diaphragm dosing pump with a rotary driving motor for the working diaphragm and a pump head with an inlet valve and an outlet valve.

Dosing pumps are already known which operate with a lifting magnet drive and accordingly perform very rapid working strokes, so that a correspondingly high dosing speed is obtained. The product to be dosed is then ejected with high speed. In many instances of use, however, slow delivery of the medium is desired. If a dosing pump is used which is capable of delivering continuously at very slow speeds, such impulsive delivery is indeed avoided, but sealing problems are encountered at the inlet valve and outlet valve, as arise in slow-running dosing pumps as a result of the small pressure differences.

SUMMARY OF THE INVENTION

The object underlying the present invention is to provide a diaphragm dosing pump operating with a rotary driving motor, with which only small pressure peaks occur during operation and which permits exact dosages even at low operating speed and with small dosing quantities. In addition, the design should permit dosing pumps of very small size.

To accomplish this object it is proposed according to the invention particularly that the rotary driving motor is electrically connected to control electronics, that the latter and the motor are designed for operation with a predeterminable starting position of the driven working diaphragm at the beginning and end of each dosing operation, that the inlet and outlet valves are designed with elastic valve disks which in the closed position have one face lying upon the opening edge which forms a valve seat and belongs to an inflow passage, that on the valve disc-side facing away from the inflow passage, within the projected extension of the inflow passage, there is a rib-like stop provided supporting the valve disc in the open position of the valve, and that the valves in each case compose complete, interchangeable units and take the form of valve inserts including a stop plate presenting the stop and an outflow passage and further including a valve mounting plate and the valve disc.

To be sure, a diaphragm pump is known from DE-A-41 18 652, which has inlet and outlet valves with elastic valve disks. However, this publication does not disclose control electronics for a dosing operation of the pump. What is more, the valves do not take the form of interchangeable units. A dosing pump is known from FR-A-2 588 319 with which partial quantities can be dosed within a total working stroke. Finally, a dosing pump is known from EP-A-0 321 339 which is equipped with a control for changing the number of strokes and speed. None of these publications shows the combination of features of the dosing pump according to the present invention, which thereby operates to especial advantage with respect particularly to the vacuum characteristics and to the accuracy of dose even with low operating speeds.

By means of the controlled driving motor, low operating speeds, and in conjunction with the predeterminable starting position, also high repeat accuracy of dose can be realized, without high pressure peaks and pulsations occurring during the dosing operation. Small pressure peaks result in advantages, among others in the blending, and furthermore by this means lesser demands are made on the sealing of the pump. The envisaged design of the valves in conjunction with the operational characteristics of the pump results in a practically non-overlapping interplay of the suction valve and pressure valve and good sealing even with the only small pressure differences occurring during operation. By this means the pump has good vacuum characteristics even at low operating speed.

As a result of the complete valve inserts provided, the parts for them can be manufactured independently of the pump head in which the valve inserts are positioned. Particularly in plastics manufacture, this presents considerable advantages with respect to accuracy in terms of injection molding. Were the valve parts to be injected directly into the pump head plates, considerable dimensional tolerances would inevitably result. This is avoided if the valve parts are manufactured separately. The high precision of the valve parts has the result, among others, of stress-free mounting of the valve disc, this being a precondition for dependable operation of the valves with good sealing even in case of small pressure differences and very slow cycles of motion. In addition, the valve inserts can be exchanged very simply as a whole.

The high precision of the valves in conjunction with the valve inserts provided also has especially favorable consequences in the dosing operation of the pump, because the dosing accuracy is also dependent on the accurate performance of the valves.

It is preferably the case that the starting position of the working diaphragm at the beginning and end of each dosing operation is the same and is preferably the bottom dead center position. Thereby, in coordination with the working cycle of the dosing pump, in the starting position the intake phase is concluded so that with the start of the pump discharge of the product to be dosed commences directly and therefore there are exactly defined preconditions.

A controlled or regulated motor can be provided as the driving motor, particularly a stepping motor or a synchronous motor operating in a control loop or a servo d.c. motor or the like.

Such motors are particularly well suited for the dosing pump according to the invention, since they permit of being positioned with sufficient accuracy and adjusted in their speed. In case of need, a speed reducer can also be provided between motor and crank drive of the diaphragm.

One configuration of the invention proposes that the stop plate and the valve mounting plate of the valves have interengaging fashioned edges and in the assembled position are in particular welded together, adhesively bonded or similarly connected.

By this means, the parts are accurately associated to one another during assembly and as a result of the interconnection, e.g. by bonding, the valve insert forms a unit which is simple to handle.

BRIEF DESCRIPTION OF THE DRAWINGS

Additional configurations of the invention are recited in the further sub-claims. The invention with its leading features will be discussed in greater detail below with reference to the drawings, in which

DETAILED DESCRIPTION OF THE INVENTION

Figure 1:
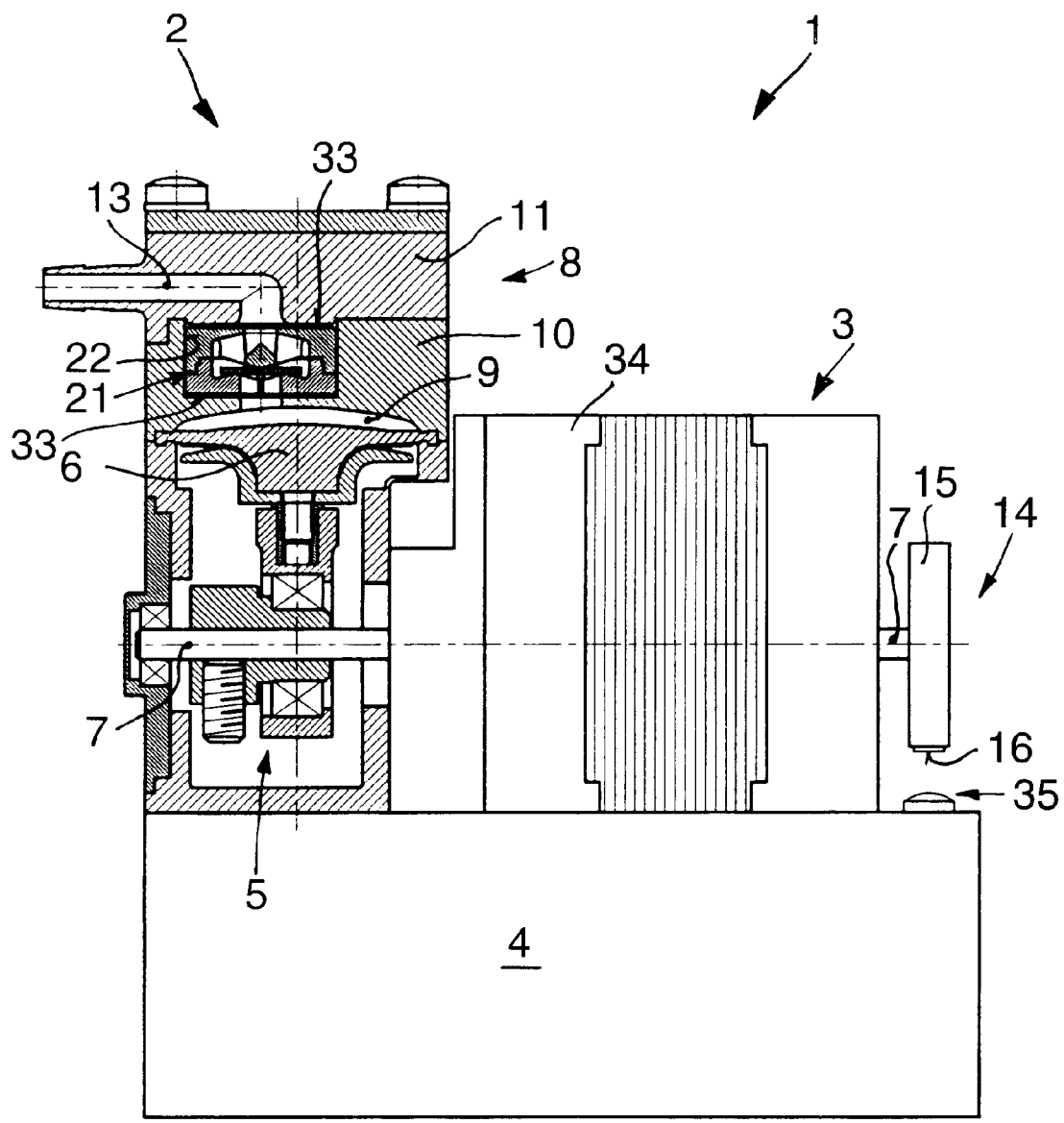
FIG. 1 is a motor-pump assembly depicted partly in section.

A motor-pump assembly depicted in FIG. 1 is a diaphragm dosing pump 1 having a pump section 2, a rotary drive 3 and control electronics 4.

The pump section 2, represented in section, shows a crank drive 5 for a working diaphragm 6. The crank drive 5 is connected to the drive shaft 7 of the rotary driving motor 3.

The pump section 2 has a pump head 8 with an end plate 10 defining the compression chamber 9 as well as a head plate 11.

Figure 2:
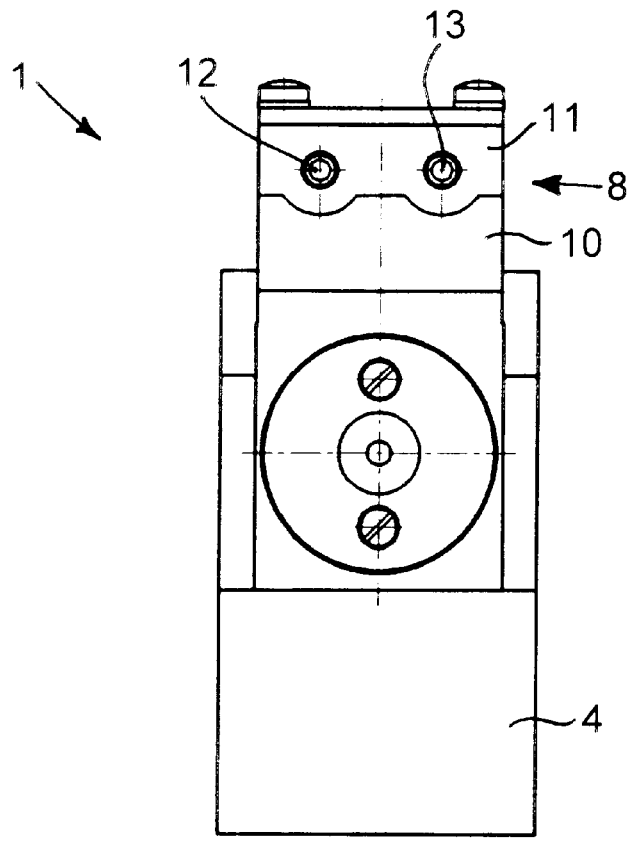
FIG. 2 is a front end view of the motor-pump assembly with a view onto the pump section.

In the head plate 11 are connecting passages 12 and 13 leading to the valves (FIG. 2). In the exemplary embodiment shown, passage 12 forms the pump inlet, and passage 13 forms the pump outlet.

The rotary driving motor 3 is composed by an electromotor 34 connected to control electronics 4, whereby here particularly a stepping motor or a synchronous motor operating in a control loop or a servo d.c. motor is possible.

It is contemplated that, after each dosing operation, the rotary drive 3 restores the working diaphragm to a predetermined, identical starting position. Preferably it is envisaged that this starting position is the bottom dead center position of the crank drive 5, where the working diaphragm 6 is in its maximum suction position. In order that this defined starting position is each time assumed, the driving motor or a part it drives is provided with a position transducer 14, preferably an optoelectronic position transducer. In case of need, another form of position transducer, e.g. an inductive or capacitive position transducer, could be given. In the present exemplary embodiment, the position transducer 14 has at a rear extension of the drive shaft 7 a disc 15 having a marking 16 at a location corresponding to the bottom dead center of the crank drive. With the aid of an optical sensor 35, the position of the marking 16 in the bottom dead center position is detected and passed on to the control electronics 4 which then stops the driving motor 34 always in the same starting position.

Figure 6:
FIG. 6 is a cross section through a valve disc.
Figure 7:
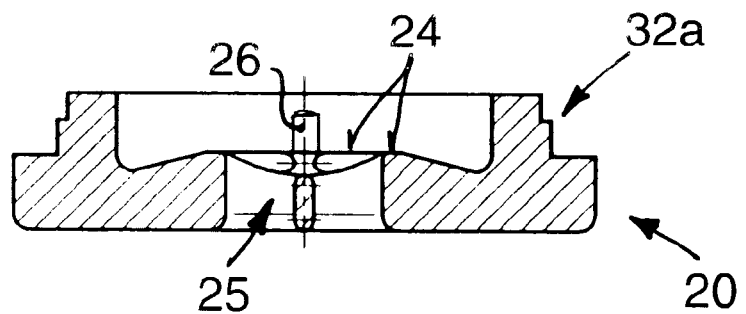
FIG. 7 is a cross section through a valve mounting plate.

By way of example, a dosing operation could take place through a single revolution of the driving motor 34, if necessary also through a larger number of revolutions, but after each dosing operation the same starting position is assumed with working diaphragm 6 situated in the bottom dead center position. The operating speed of the rotary drive 3 can be adjustable in the range of less than one revolution per minute to several hundreds of revolutions per minute. Therefore very slow working strokes are possible. In order to achieve a reliable sealing behavior even with such slow operating speeds and with the small pressure differences then occurring between suction and delivery sides, inlet and outlet valves are provided in the form of disk valves 17, one of which is shown in cross section in FIG. 3. As is clearly shown in FIGS. 5 to 7, such a disk valve consists of three parts, namely the stop plate 18 to be seen in FIG. 5, the valve disk 19 to be seen in FIG. 6 and the valve mounting plate 20 to be seen in FIG. 7. A complete, can-like unit is formed as valve insert 21 from these three parts 18, 19 and 20. The end plate 10 of the pump head 8 is provided with recesses 22 which serve to receive the two valve inserts 21 and into which the valve inserts 21 are inserted and held after placement of the head plate 11.

In case of need, the valve inserts 21 composing functional units can be simply interchanged as a whole. In FIG. 1 the outlet valve is depicted in sectional form and the inlet valve (cf. also FIG. 2) next to it is turned through 180° so as to be inserted in the respective recess 22 in an inverted condition. The allocation of the suction side and delivery side can be selected as desired by turning the valve inserts 21.

The valves provided for the diaphragm dosing pump according to the invention are distinguished, inter alia, by a high closing and opening speed, so that an almost non-overlapping interplay of the suction valve and pressure valve is attained. In addition, the valves exhibit a reliable sealing behaviour even with the smallest pressure differences between the side facing the compression chamber 9 and the side facing away from the compression chamber 9. Therefore a reliable pumping operation, or more specifically a reliable dosing operation, is ensured even with the smallest frequencies of stroke.

Figure 3:
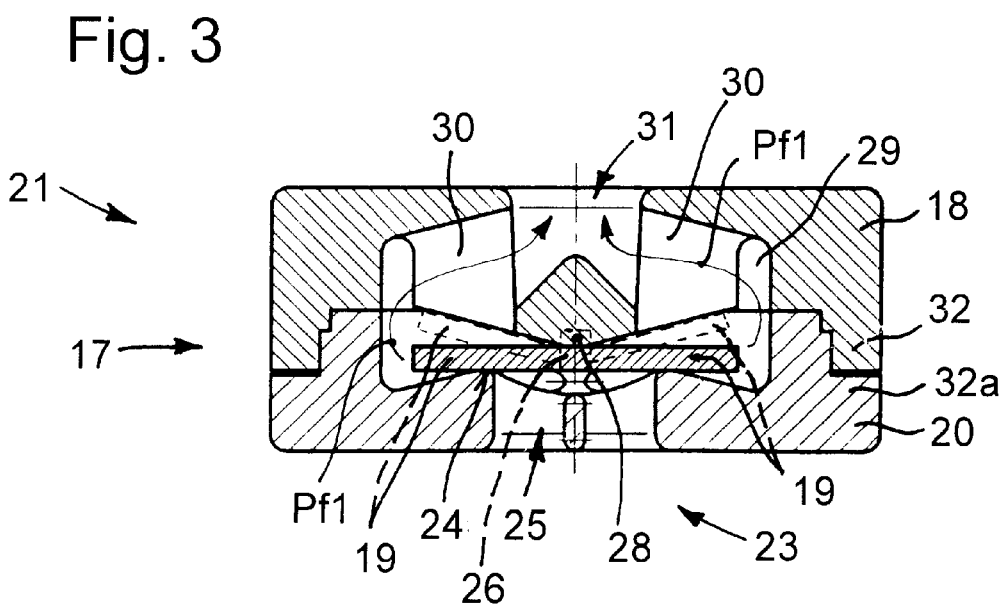
FIG. 3 is a cross section through a valve insert.
Figure 8:
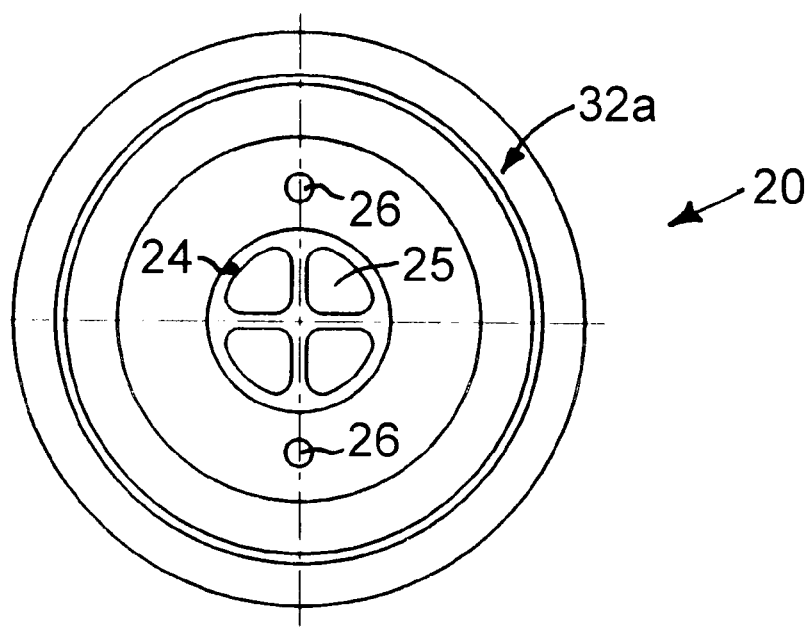
FIG. 8 is an internal view of the valve mounting plate shown in FIG. 7.

As is clearly shown in FIG. 3, in a valve arranged on the suction side, the face of the valve disk 19 facing the suction side 23 lies in the closed position upon the opening edge 24 which forms a valve seat and belongs to a central inflow passage 25 in the valve mounting plate 20. The valve disc 19 is held against sideward movement by positioning pins 26 which are laterally disposed beside the opening edge and engage with open-ended recesses of the valve disk 19. The positioning pins are clearly shown in FIGS. 7 and 8. In the assembled position they penetrate the valve disc 19 and engage with counter-recesses 27 in the stop plate 18 (cf. FIG. 4). These positioning pins 26 at the valve mounting plate 20 and the counter-recesses 27 in the stop plate 18 also form a positioning aid when putting these two plates together in the proposed assembled position.

In the valve turned through 180° arranged on the delivery side of the pump, delivery side and suction side of the valve are exchanged accordingly.

The stop plate 18 has within the projected extension of the inflow passage of the valve mounting plate 20 a rib-like stop 28 by way of which the valve disc 19 in the open position is supported generally along a diametral line. In the open position of the valve, the valve disk flaps situated on either side of the central supporting line are swung toward the stop plate 18, so that the inflow passage 25 is opened. This open position is indicated by dashed lines in FIG. 3. The distance of the plane running through the supporting point of the stop 28 from the parallel plane formed by the opening edge 24 is proportioned in such a way that the valve disk 19 is held stress-free therebetween. The distance hence corresponds to the thickness of the valve disk 19. The stress-free mounting of the valve disk 19 is the precondition for response of the valve disk even with the smallest pressure differences and also for a rapid closing and opening operation.

Figure 4:
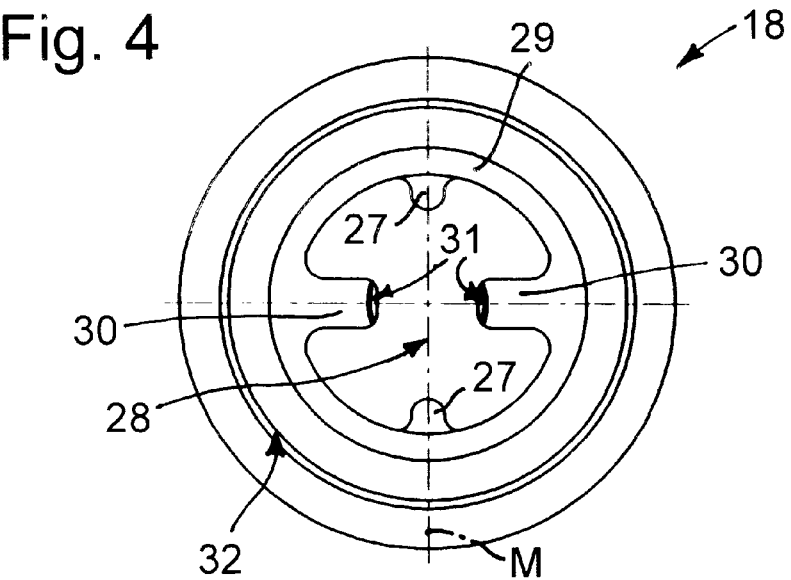
FIG. 4 is an internal view of a stop plate.
Figure 5:
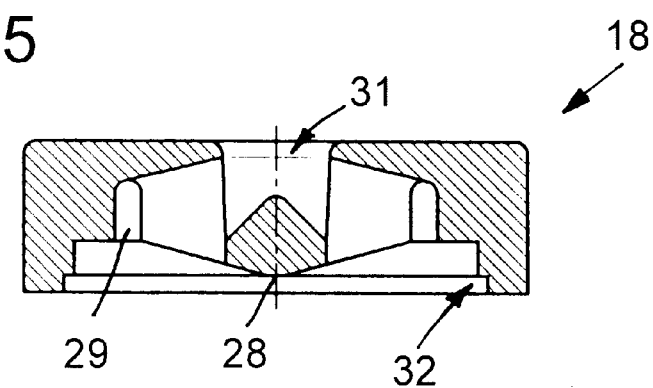
FIG. 5 is a cross section through the stop plate shown in FIG. 4.

FIGS. 4 and 5 show that the stop of the stop plate 18 takes a curved course on either side of the vertical line of the stop formed by center line M and is matched to the bending shape of the valve disk 19 in the open position (cf. the valve disk 19 marked in dashed lines in FIG. 3). In the open position the valve disk 19 is hence supported substantially areally. The diameter of the curved supporting surface corresponds approximately to the diameter of the valve disk 19. Around this area is an annular space 29 which is connected to the outflow passage 31 in the stop plate 18 by way of opposite side slots 30 in the stop. In the open position, the pumped medium can hence pass via the inflow passage 25, laterally outwardly past the valve disk 19 situated in the open position, into the annular space 29 and from there into the outflow passage 31 via the lateral slots 30, as is indicated by arrows Pf1 in FIG. 3.

The stop plate 18 and the valve mounting plate 20, which practically form housing parts of the valve insert, have fashioned edges 32, 32a with complementary profiling so that they interengage in the assembled position (FIG. 3). The fashioned edges can be configured in such a way as to produce a sealing and retentive press fit when the stop plate 18 and valve mounting plate 20 are joined. In case of need, the two parts can also be welded or adhesively secured together. The valve inserts 21 inserted into the receiving recesses 22 of the end plate 10 can be provided with centrally apertured sealing rings 33 (FIG. 1) arranged on the face, or the valve inserts 21 can themselves be configured in such a way that adequate sealing is produced on the face.

As clearly shown in fig. 1, the motor-pump assembly together with the control electronics 4 forms a compact constructional unit.

We claim:

1. A diaphragm dosing pump comprising a rotary driving motor which rotates in one direction for a working diaphragm and a pump head with an inlet valve and an outlet valve, the rotary driving motor (3) is electrically connected to control electronics (4), the control electronics and the motor are designed for operation with a predeterminable starting position of the driven working diaphragm (6) at a beginning and end of each dosing operation, the inlet and outlet valves are designed with elastic valve disks (19) which in closed position have one face lying upon an opening edge (24) which forms a valve seat Qf an inflow passage (25), the elastic valve disks being mounted stress-free in the closed position, on a valve disc-side facing away from the inflow passage, within a projected extension of the inflow passage, a rib-like stop (28) is provided supporting the valve disc at least in an open position of the valve, and the valves in each case comprise complete, interchangeable units and are in a form of valve inserts (21) including a stop plate (18) presenting the stop (28) and an outflow passage (31) and further including a valve mounting plate (20) and the valve disc (19).

2. A pump as claimed in claim 1, wherein the starting position of the working diaphragm (6) is the same at the beginning and end of each dosing operation and is a bottom dead center position.

3. A pump as claimed in claim 1, wherein at least one of a number of working strokes of the working diaphragm (6) and a driving speed are adjustable.

4. A pump as claimed in claim 3, wherein the speed of the driving motor (34) or the number of strokes of the working diaphragm (6) is adjustable in a range of less than one revolution per minute to several hundreds of revolutions per minute.

5. A pump as claimed in claim 1, wherein a controlled motor is provided as the driving motor (34), the controlled motor comprising one of a stepping motor, a synchronous motor operating in a control loop, and a servo d.c. motor.

6. A pump as claimed in claim 1, wherein the driving motor (34) is provided with a position transducer (14) connected to the control electronics (4).

7. A pump as claimed in claim 1, wherein at the inlet and outlet valves the stop (28) for the valve disk (19) takes a curved course on either side of a vertical line of the stop and is matched to a bending shape of the valve disk (19) in the open position.

8. A pump as claimed in claim 1, wherein the stop plate (18) and the valve mounting plate (20) of the valves have interengaging fashioned edges (32, 32a) and in an assembled position are connected together by one of being welded together and adhesively bonded.

9. A pump as claimed in claim 7, wherein the valve mounting plate has positioning pins engaging at an edge of the valve disk and the stop plate has, at ends of the vertical line of the stop, recesses for engagement of the positioning pins.

10. A pump as claimed in claim 1, wherein receiving recesses (22) for inserting the valve inserts (21) are provided in the pump head.

11. A pump as claimed in claim 10, wherein the pump head (8) has a head plate (11) covering and holding the receiving recesses (22) for the valve inserts (21) and has connecting passages leading to the valves.

12. A pump as claimed in claim 1, wherein a drive-pump assembly together with the control electronics forms an integral functional unit.

13. A pump as claimed in claim 4, wherein the speed of the driving motor (34) or the number of strokes of the working diaphragm (6) is adjustable in a range of 0.5 revolutions per minute to 300 revolutions per minute.

14. A pump as claimed in claim 6, wherein the position transducer (14) is a contact-free, optoelectronic position transducer connected to the control electronics (4).

* * * * *